United States Patent [19]

Hsu et al.

[11] Patent Number: 4,529,487

[45] Date of Patent: Jul. 16, 1985

[54] COATING FOR INCREASING CORROSION RESISTANCE AND REDUCING HYDROGEN REEMBRITTLEMENT OF METAL ARTICLES

[75] Inventors: Grace F. Hsu, Issaquah; Richard C. Colonel, Renton, both of Wash.

[73] Assignee: The Boeing Company, Seattle, Wash.

[21] Appl. No.: 537,335

[22] Filed: Sep. 29, 1983

[51] Int. Cl.[3] .......................... B32B 15/08; C25D 5/50

[52] U.S. Cl. .................................. 204/37.1; 428/626; 204/44.2; 204/43.1

[58] Field of Search ............ 428/626; 204/37.1, 38 E, 204/44 Z, 43

[56] References Cited

U.S. PATENT DOCUMENTS

| | | | |
|---|---|---|---|
| 2,069,983 | 2/1937 | Ubben | 134/26 |
| 2,740,726 | 3/1956 | Anderson | 427/106 |
| 2,934,510 | 4/1960 | Crissey et al. | 260/31.8 |
| 2,949,383 | 8/1960 | Blake | 428/72 |
| 3,011,909 | 12/1961 | Hart et al. | 427/410 |
| 3,083,150 | 3/1963 | Takada | 204/43 |
| 3,139,325 | 6/1964 | Takada | 23/14 |
| 3,362,844 | 1/1968 | Christenson et al. | 428/458 |
| 3,849,176 | 11/1974 | Asano et al. | 428/626 |
| 4,180,598 | 12/1979 | Emmons | 427/44 |
| 4,274,933 | 6/1981 | Kamada et al. | 204/159.24 |
| 4,343,728 | 8/1982 | Eschwey et al. | 523/456 |
| 4,357,396 | 11/1982 | Grunewalder et al. | 428/626 |
| 4,407,899 | 10/1983 | Hara et al. | 428/626 |
| 4,411,964 | 10/1983 | Hara et al. | 428/626 |

OTHER PUBLICATIONS

Wang Sheng Shin et al., Cadmium-Titanium Electrodeposits from Non Cyanide Baths, *Plating and Surface Finishing*, Dec. 1981, pp. 62-64.

*Primary Examiner*—Veronica O'Keefe
*Attorney, Agent, or Firm*—Christensen, O'Connor, Johnson & Kindness

[57] ABSTRACT

Plated high strength steel articles having a metallic plated coating exhibit high corrosion resistance and low hydrogen reembrittlement characteristics when an acrylic polymeric coating, such as a methyl methacrylate polymer is applied to the article. A corrosion inhibitor and adhesion promoter such as benzotriazole and a leveling agent such as an alkyd polymer can be incorporated with the acrylic polymer in minor proportions to further enhance the corrosion resistance characteristics of the coating. A benzotriazole-containing acrylic polymer formulation also enhances the corrosion resistance characteristics of an unplated metal substrate.

12 Claims, No Drawings

COATING FOR INCREASING CORROSION RESISTANCE AND REDUCING HYDROGEN REEMBRITTLEMENT OF METAL ARTICLES

BACKGROUND OF THE INVENTION

The present invention relates to polymer coated high strength steel articles that exhibit excellent corrosion resistance and simultaneously exhibit low hydrogen embrittlement and reembrittlement characteristics, and methods for making the same. The present invention also relates to polymer coated articles exhibiting excellent long term corrosion resistance.

High strength structural materials such as high strength steels do not in their bare form generally offer desirable corrosion resistance properties. Consequently, techniques have been developed for improving the corrosion resistance of these high strength materials. Often, a metal or metal alloy is plated onto the high strength steel to enhance its environmental stability.

It has been found, however, that when metallic coatings are plated onto high strength materials, hydrogen is often co-deposited at the surface of the metal substrate. The presence of the hydrogen has detrimental effects on various physical and mechanical properties of the high strength materials. For example, once hydrogen enters a high strength steel substrate, the metal substrate loses its ductility, and depending upon the level of hydrogen present in the substrate, can suffer brittle failure when subjected to stress. This much studied, but vaguely understood, phenomenon is referred to as "hydrogen embrittlement".

The hydrogen embrittlement problem associated with plating of metallic coatings onto a high strength steel substrate has for years been remedied by the use of a corrosion resistant cadmium-titanium coating. Once the cadmium-titanium coating has been applied to the substrate, the coated article is baked at an elevated temperature for an extended period of time to drive any hydrogen from the substrate. This procedure has been found to eliminate the hydrogen embrittlement problem. More recently, the use of an electroplated zinc-nickel alloy has been recommended for replacement of the old cadmium-titanium process. Use of the zinc-nickel also requires baking following the plating process to eliminate hydrogen from the substrate.

More recently it has been noted that hydrogen may enter a metallic coating and again find its way to the metal substrate while the plated high strength steel is in use. This hydrogen migration especially occurs where the plated high strength steel is subjected to a corrosive environment, particularly a saline environment or where a plating deposit is scratched or otherwise mechanically damaged. If a sufficient amount of hydrogen accumulates within the substrate, the hydrogen embrittlement problem can reappear. This phenomenon is referred to as "hydrogen reembrittlement". Hydrogen reembrittlement can again result in brittle failure of the high strength steel parts when subjected to stress. By carefully controlling the zinc-nickel plating process referenced above, the hydrogen reembrittlement problem can be minimized.

SUMMARY OF THE INVENTION

The present invention provides plated metallic articles that are coated with a polymeric material that enhances the corrosion resistance and virtually eliminates the reembrittlement phenomenon, as well as methods for producing the same. A plated metallic article produced in accordance with the present invention comprises a high strength steel substrate, a metallic plated coating adhered to the substrate, and an acrylic polymer coating overlying the plated coating. In a preferred embodiment of the invention, the polymer coating comprises methyl methacrylate polymer. Further improvement in the corrosion resistance and the hydrogen reembrittlement characteristics can be provided by the addition of a corrosion inhibitor and adhesion promoter and a leveling agent to the polymer before it is applied to the high strength steel substrate. The acrylic polymer is preferably applied to the substrate in solution with the levelling agent and with the corrosion inhibitor and adhesion promoter.

As a corollary, it has been discovered that when the corrosion inhibitor and adhesion promoter is added to the acrylic polymer, the combination when applied as a coating to a metal substrate, provides a high degree of corrosion resistance to the substrate regardless of whether a plated metallic coating has been first applied. This aspect of the invention calls for the application of an acrylic polymer and a corrosion inhibitor and adhesion promoter, preferably benzotriazole, to the metallic substrate. The acrylic polymer and corrosion inhibitor and adhesion promoter provide a coating that is surprisingly superior in corrosion resistance when contrasted with a coating comprising an acrylic polymer alone.

DETAILED DESCRIPTION OF THE INVENTION

The present invention can be employed with virtually any combination of metal substrate and plated coating that exhibits the hydrogen reembrittlement phenomenon. For example, the present invention is especially effective with steel substrates onto which has been plated a corrosion resistant coating composed of a cadmium/titanium or a zinc/nickel alloy. The polymeric coating applied, as discussed in more detail below, virtually eliminates the hydrogen reembrittlement problem even where portions of the coating itself have been subjected to mechanical damage.

The polymeric coating that enhances corrosion resistance as well as prevents hydrogen reembrittlement of a plated metal article can be chosen from the class of thermoplastic polymers or copolymers generally referred to as acrylic polymers. This class includes polymers made from acrylic acid, methacrylic acid, esters of these acids, such as methyl methacrylate, and acrylonitrile. A preferred material is the methyl methacrylate polymer sold under the "Acryloid" trademark, product designation B 44 and B 48N, by the Rohm & Haas Company of Philadelphia, Pa.

Normally, acrylic resins of this type are sold in a liquid solution. Typical solvents for the polymers include toluene. Normally solubilizers such as methyl cellosolve are included in the polymer solution. For example, the "Acryloid" B 44 resin contains approximately 40 percent by weight based on the total solution solids (polymer) while the "Acryloid" B 48N polymer contains approximately 45 percent by weight solids. The solubilizer normally constitutes from 2 to 4 percent by weight of the solution while the balance of the solution is solvent.

When applying the acrylic polymers to a substrate in accordance with the present invention, it is usually preferred to dilute the commercially available solution with additional solvent such as toluene. Lower alcohols such as ethanol and isopropanol can also readily be employed. Other usable solvents include aromatic hydrocarbons and lower esters and ketones. When a commercial acrylic resin containing 40 percent solids is diluted to approximately 15 percent by weight solids, a thin coating on the order of 0.02 to 0.05 mil is obtained when the article is dipped into the solvent solution. By increasing the solids content to approximately 30 percent by weight, an increase in film thickness to about 1 mil is obtained. Preferably, the solids content of a coating solution utilized in accordance with the present invention is maintained in the range of from 5 to 40 percent to provide adequate film thicknesses.

In addition to the solvent, it is preferred to add an corrosion inhibitor and adhesion promoter to the polymer solution prior to its application to the plated metallic article. The preferred corrosion inhibitor and adhesion promoter is benzotriazole. This corrosion inhibitor and adhesion promoter can be added in minor amounts to enhance the corrosion resistance characteristics of the final coated article. Benzotriazole can be added to the coating solution in amounts from about 0.01 to about 2 percent by weight based on the total coating solution.

In order to obtain a uniform coating, a leveling agent such as "Paraplex G-60" sold by the C. P. Hall Company of Chicago, Ill., is also added to the coating solution. "Paraplex" is an alkyd polyester resin that is based on long chain polybasic acids esterified with polyhydric alcohols such as glycerol or ethyleneglycol. Addition of leveling agents in amounts ranging from 0.1 to about 2 percent by weight based on the total coating solution will provide an even coating that exhibits a relatively uniform thickness.

It has also been found that the acrylic resin containing the corrosion inhibitor and adhesion promoter benzotriazole surprisingly and unexpectedly enhances the corrosion resistance characteristics of a coated metallic article, when subjected to all types of corrosion including galvanically induced corrosion. For the same reasons, the polymeric coating also will inhibit hydrogen embrittlement of unplated metals. For example, when an aluminum skin is coated with an acrylic resin/benzotriazole mixture prepared as described above, the corrosion resistance is surprisingly substantially better than when an aluminum skin is coated with an acrylic resin mixture alone. Note also that aromatic hydrocarbons, esters, and ketones are also acrylic resin solvents.

EXAMPLES

The following examples are included to assist one of ordinary skill in making and using the invention. They are intended as representative examples of the present invention and are not intended in any way to limit the scope of protection granted by Letters Patent hereon. All parts and percentages referred to in the following examples are by weight unless otherwise indicated.

EXAMPLE I

An aqueous electroplating bath was prepared containing per liter of solution 15 grams of zinc oxide, 30 milliliters of hydrochloric acid (38% by weight HCl), 49 grams of nickel chloride hexahydrate, 180 grams of ammonium chloride, 20 grams of boric acid, 2.25 grams of a nonionic polyoxyalkylated surfactant ("Igepal CO-730"), and 0.75 grams of an anionic surfactant (Duponol ME Dry"). The pH of the bath was adjusted to 6.3 by the addition of ammonium hydroxide. The ratio of nickel ions to zinc ions in the solution is about 1.0. The temperature of the bath was 24° C. During plating, the bath was not agitated.

Notched tensile specimens manufactured and tested in accordance with ASTM F-519, Type Ia, were plated in the bath. Two nickel and two zinc rods having similar area were used as anodes and arranged symmetrically about the specimens. The specimens were plated at preselected current densities for preselected times. After plating and chromating, the specimens were baked for 12 hours at 190° C. The specimens were then tested by static tensile loading at 45 percent or 75 percent of established notch ultimate tensile strength while the notch was exposed to distilled water or 3.5 percent by weight aqueous salt solution. The specimens were loaded continuously for at least 150 hours or until failure. The specimens that withstand loading for at least 150 hours exhibit satisfactory low hydrogen embrittlement and reembrittlement characteristics.

A first set of specimens, A, B, C, D, and F were plated in accordance with the foregoing procedure at an average cathode current density of 2.0 amperes per square decimeter for 15 minutes. A second set of specimens G and H were plated in accordance with the foregoing procedure at an average cathode current density of 1.0 amperes per square decimeters for 30 minutes. Specimens A and H were immersed in a 3.5 percent salt solution and subjected to the notch tensile specimen test at a loading of 45 percent of ultimate tensile strength. Specimen A failed in 6 minutes while specimen H failed after 24.6 hours of loading. Specimen F was scratched in the notch area by scribing the notch four strokes with a sharp instrument to expose bare steel. Then the specimen was immersed in distilled water and loaded to 45 percent of ultimate tensile strength. Specimen F failed in 54 minutes.

EXAMPLE II

For comparison, the procedure of Example I was repeated with the exception that 19 grams of zinc oxide, 38 milliliters of hydrochloric acid, and 28 grams of nickel chloride were used per liter to prepare a second plating solution. The ratio of nickel to zinc ions in this solution was 0.4. A specimen K was plated at an average cathode current density of 2.0 amperes per square decimeter for 15 minutes. After plating, chromating and baking, the specimen was coated with a coat of epoxy-amine primer designated Boeing Material Specification (BMS) 10-11 K, Type I primer, Class A, Green, available from DeSoto, Inc., Chemical Coating Division, Fourth and Cedar Streets, Berkeley, Calif. 94710 and one coat of epoxy enamel designated BMS 10-11 K, Type II enamel, Class A, available from The Koppers Company, Inc., 5900 S. Eastern Avenue, Commerce, Calif. 90040. Specimen K was immersed in a 3.5 percent salt solution and loaded at 75 percent ultimate tensile strength. The specimen failed after only 6 minutes of loading. The epoxy primer enamel thus did not provide adequate protection against hydrogen reembrittlement.

EXAMPLE III

The procedure of Example I was repeated with the exception that 11.2 grams of zinc oxide, 22.4 milliliters of hydrochloric acid and 60 grams of nickel chloride were used per liter to prepare the plating solution. The ratio of nickel to zinc ions in the solution was 1.5. Two specimens, L and M, were plated at an average cathode current density of 2.0 amperes per square decimeter for 19 minutes. After chromating and baking, specimen L was immersed in an acrylic polymer solution which was prepared containing per liter of solution 400 grams of methyl methacrylate polymer available as Acryloid B-44 (40% resin), 500 milliliters of toluene and 100 milliliters of isopropanol. The specimen was immersed in the polymer solution for approximately 10 seconds and then allowed to air dry. The average film thickness of the polymer coating on the specimen is about 0.02 mil to 0.05 mil. The specimen was immersed in a 3.5 percent saline solution and subjected to the notch tensile specimen test under a loading of 45 percent of ultimate tensile strength. After the specimen withstood loading for 210.8 hours without breaking, it was removed from testing. The acrylic polymer coating substantially reduced the tendency for reembrittlement in a corrosive environment.

EXAMPLE IV

Specimen M from Example III was chromated and baked and was then immersed in an organic solution prepared in accordance with Example III that also contained 5 grams per liter of benzotriazole and 5 grams per liter of a leveling compound, an alkyd resin available commercially as "Paraplex G-60" from C. P. Hall Co. The specimen was immersed in the coating solution for approximately 2 to 3 seconds removed and allowed to air dry. The notch was then scribed four times in the same region with a sharp knife to expose the steel substrate. The specimen was then immersed in a 3.5 percent aqueous salt solution and subjected to a loading of 45 percent of ultimate tensile strength. After the specimen withstood loading for 311 hours without breaking, it was removed from testing. The coating containing the benzotriazole substantially reduced the tendency for reembrittlement in a corrosive environment even under the more severe test procedure where a scratch was placed on the specimen notch.

EXAMPLE V

After chromating and baking, specimens C and D, plated in accordance with Example I, were immersed in an acrylic polymer solution containing per liter of solution 400 grams of acrylic resin (Acryloid B-44, 40% resin), 500 milliliters of toluene, 100 milliliters of isopropanol and 5 grams of benzotriazole. The specimens were immersed in the coating solution for approximately 10 seconds and then allowed to air dry. The notch of specimen C was scribed four times to expose bare steel. The notch of specimen D was not scratched. Specimen C was immersed in distilled water and specimen D immersed in a 3.5 percent aqueous salt solution. Both specimens were loaded at 45 percent of ultimate tensile strength. After specimen C survived for 240.4 hours and specimen D survived for 261.8 hours without breaking, they were removed from testing. The acrylic polymer coating substantially reduced the tendency for reembrittlement in both the corrosive and damaged environments.

EXAMPLE VI

Specimens B and G plated in accordance with Example I were chromated and baked. The specimens were then immersed in an acrylic polymer solution containing per liter of solution 750 grams of acrylic resin (Acryloid B-44, 40% resin), 195 grams of toluene, 50 grams of ethanol and 5 grams of benzotriazole. The specimens were immersed for 2 to 3 seconds, removed and air dried. The average film thicknesses produced were approximately 1 mil. Specimen B was immersed in a 3.5 percent aqueous salt solution and stressed to 45 percent of its ultimate tensile strength. Specimen B survived testing for 460.7 hours without failure. Specimen G was immersed in a 3.5 percent aqueous salt solution and stressed to 75 percent of their ultimate tensile strength. Specimen G survived testing for 213.5 hours without failure. Thereafter, specimen G was scratched at the notch to expose bare steel and was thereafter immersed in distilled water and subjected to stress at 45 percent of its ultimate tensile strength. Specimen G survived for an additional 219 hours without failure. The organic coating clearly reduces the susceptibility for reembrittlement of the notch tensile specimens.

EXAMPLE VII

The following example shows the effect of methyl methacrylate polymeric coatings on corrosion resistance and the further improvement on corrosion resistance when benzotriazole is combined with methyl methacrylate polymers. Test panels P, Q and R measuring two inches by four inches of 7075 bare aluminum were wiped with methylethyl ketone to degrease them. Panel P was brushed with a coat of acrylic polymer solution prepared in accordance with Example III. Panel Q was brushed with the same organic solution further containing 5 grams per liter of benzotriazole. The panels were allowed to air dry. The panels, including control panel R without any polymer coating, were tested by continuous exposure to salt spray in accordance with ASTM B117. After 384 hours of exposure, the uncoated control panel had pits and white corrosion over its entire surface. Panel Q coated with the benzotriazole containing acrylic polymer formulation was still clear with no evident corrosion. After 2,472 hours, the uncoated control panel R was severely corroded while panel Q showed no signs of corrosion. Panel P coated only with the acrylic polymer formulation exhibited white corrosion after 2,040 hours of exposure. Panel P showed less corrosion than panel R without the acrylic polymer coatings; however, it was not as corrosion resistant as panel Q coated with the benzotriazole containing formulation.

The present invention has been disclosed in connection with preferred embodiments thereof. One of ordinary skill will be able to effect various alterations, substitutions and equivalents, and other changes without departing from the spirit and broad scope of the invention as disclosed. It is therefore intended that the scope of Letters Patent granted hereon be limited only to the definition contained in the appended claims and equivalents thereof.

The embodiments of the invention in which an exclusive property and privilege are claimed are defined as follows:

1. A method for producing a steel article having excellent corrosion resistance and exhibiting low hydrogen embrittlement and low hydrogen reembrittlement characteristics comprising the steps of:

electroplating a corrosion resistant metallic coating on said article, baking said plated article to drive entrapped hydrogen from said article, and thereafter applying to said plated article a coating material comprising an acrylic polymer selected from-the group consisting of acrylic acid, acrylic acid esters, methacrylic acid, methacrylic acid esters, and acrylonitrile and a solvent therefor.

2. The method of claim 1 wherein said acrylic polymer comprises methyl methacrylate polymer.

3. The method of claim 2 wherein said coating material further comprises a corrosion inhibitor and adhesion promoter.

4. The method of claim 3 wherein said corrosion inhibitor and adhesion promoter comprise benzotriazole.

5. The method of claim 1 wherein said coating material further comprises a leveling agent.

6. The method of claim 5 wherein said leveling agent comprises an alkyd resin.

7. The method of claim 1 wherein said coating material further comprises a corrosion inhibitor and adhesion promoter and a leveling agent.

8. The method of claim 2 wherein said corrosion inhibitor and adhesion promoter comprises benzotriazole and said leveling agent comprises an alkyd resin.

9. The method of claim 8 wherein said metallic coating comprises a zinc-nickel alloy.

10. The method of claim 8 wherein said coating material when applied to said plated article comprises from 5 to 40 percent methyl methacrylate, up to about 2 percent benzotriazole, and up to about 2 percent of said alkyd resin, the balance comprising a solvent therefor.

11. The method of claim 10 wherein said solvent comprises materials selected from the group consisting of toluene, methycellosolve, and lower alcohols, ketones and esters, and aromatic hydrocarbons.

12. A method for producing a steel article having excellent corrosion resistance and exhibiting low hydrogen embrittlement and low hydrogen reembrittlement characteristics comprising the steps of:

electroplating a corrosion resistant metallic coating selected from the group consisting of a cadmium-titanium alloy and a zinc-nickel alloy on said article, baking said plated article at an elevated temperature to drive entrapped hydrogen from said article, and thereafter applying to said article a coating material comprising an acrylic polymer selected from-the group consisting of acrylic acid, acrylic acid esters, methacrylic acid, methacrylic acid esters, and acrylonitrile and a solvent therefor.

* * * * *